United States Patent
Pierson et al.

(10) Patent No.: US 10,108,519 B2
(45) Date of Patent: *Oct. 23, 2018

(54) EXTERNAL STORAGE DEVICE SECURITY SYSTEMS AND METHODS

(71) Applicant: Viewpost IP Holdings, LLC, Maitland, FL (US)

(72) Inventors: Christopher Pierson, Lake Mary, FL (US); Andrew McCormack, Orlando, FL (US)

(73) Assignee: Viewpost IP Holdings, LLC, Maitland, FL (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/374,901

(22) Filed: Dec. 9, 2016

(65) Prior Publication Data

US 2017/0286249 A1    Oct. 5, 2017

Related U.S. Application Data

(63) Continuation of application No. 15/084,005, filed on Mar. 29, 2016, now Pat. No. 9,582,445.

(51) Int. Cl.
  *G06F 11/30* (2006.01)
  *G06F 13/38* (2006.01)
  (Continued)

(52) U.S. Cl.
  CPC .......... *G06F 11/3055* (2013.01); *G06F 9/226* (2013.01); *G06F 11/3027* (2013.01);
  (Continued)

(58) Field of Classification Search
  CPC .... G06F 13/385; G06F 9/226; G06F 13/4072; G06F 13/4282
  (Continued)

(56) References Cited

U.S. PATENT DOCUMENTS

| | | | |
|---|---|---|---|
| 6,418,486 B1 * | 7/2002 | Lortz | G06F 9/4415 709/217 |
| 7,082,598 B1 | 7/2006 | Le et al. | |

(Continued)

FOREIGN PATENT DOCUMENTS

WO    WO-2017172166 A1    10/2017

OTHER PUBLICATIONS

"U.S. Appl. No. 15/084,005, Examiner Interview Summary dated Sep. 20, 2016", 3 pgs.

(Continued)

*Primary Examiner* — Paul R Myers
(74) *Attorney, Agent, or Firm* — Schwegman Lundberg & Woessner, P.A.

(57) ABSTRACT

Systems and methods are presented for detecting, by a universal serial bus (USB) drive operatively coupled with a computing device, power from the computing device, and determining, by the USB drive, that drivers associated with the USB drive have been installed on the computing device. The systems and methods may determine that drivers associated with the USB drive have been installed by sending, to the computing device, a digital signal indicating a predetermined keystroke until the USB drive receives a response from the computing device, and receiving, from the computing device, a feedback response to the digital signal indicating the predetermined keystroke has been received. The systems and methods further executing, by the USB drive, a macro to download a payload to the computing device from a server computer, causing by the USB drive, the payload to execute on the computing device, and causing, by the USB drive, the downloaded payload to be deleted from the computing device.

20 Claims, 7 Drawing Sheets

(51) Int. Cl.
*G06F 13/42* (2006.01)
*G06F 13/40* (2006.01)
*G06F 9/22* (2006.01)

(52) U.S. Cl.
CPC ...... *G06F 11/3048* (2013.01); *G06F 11/3051* (2013.01); *G06F 13/385* (2013.01); *G06F 13/4072* (2013.01); *G06F 13/4282* (2013.01)

(58) Field of Classification Search
USPC .......................................................... 710/104
See application file for complete search history.

(56) References Cited

U.S. PATENT DOCUMENTS

| | | | |
|---|---|---|---|
| 7,629,963 B1 | 12/2009 | Wright | |
| 8,713,683 B2 | 4/2014 | Moore et al. | |
| 8,825,909 B1 | 9/2014 | Delco | |
| 9,203,862 B1 | 12/2015 | Kashyap et al. | |
| 9,241,269 B1 | 1/2016 | Giridharan et al. | |
| 9,262,147 B1 | 2/2016 | Gutnik et al. | |
| 9,354,898 B1* | 5/2016 | Luttmann | G06F 9/4415 |
| 9,582,445 B1* | 2/2017 | Pierson | G06F 9/226 |
| 2003/0046674 A1* | 3/2003 | Gentry | G06F 9/4411 |
| | | | 717/171 |
| 2003/0131136 A1 | 7/2003 | Emerson et al. | |
| 2003/0159070 A1 | 8/2003 | Mayer et al. | |
| 2005/0210463 A1* | 9/2005 | Abe | G06F 9/4413 |
| | | | 717/174 |
| 2006/0028433 A1 | 2/2006 | Myrick | |
| 2008/0086775 A1 | 4/2008 | Repasi et al. | |
| 2009/0172219 A1 | 7/2009 | Mardiks | |
| 2011/0038005 A1* | 2/2011 | Ochiai | G03G 15/5075 |
| | | | 358/1.15 |
| 2012/0240234 A1 | 9/2012 | Lomont et al. | |
| 2013/0160124 A1 | 6/2013 | Ståhlberg et al. | |
| 2013/0326260 A1* | 12/2013 | Wei | G06F 11/20 |
| | | | 714/3 |
| 2014/0199663 A1 | 7/2014 | Sadeh-Koniecpol et al. | |
| 2015/0065111 A1 | 3/2015 | Kobayashi | |
| 2015/0294151 A1 | 10/2015 | Kobayashi | |

OTHER PUBLICATIONS

"U.S. Appl. No. 15/084,005, Non Final Office Action dated Aug. 18, 2016", 9 pgs.
"U.S. Appl. No. 15/084,005, Notice of Allowance dated Oct. 18, 2016", 8 pgs.
"U.S. Appl. No. 15/084,005, Response filed Sep. 21, 2016 to Non Final Office Action dated Aug. 18, 2016", 12 pgs.
"International Application Serial No. PCT/US2017/019729, International Search Report dated Mar. 16, 2017", 3 pgs.
"International Application Serial No. PCT/US2017/019729, Written Opinion dated Mar. 16, 2017", 5 pgs.
"USB Rubber Ducky Wiki", Website generated with MDwiki (http://www.mdwiki.info) © Timo Dörr and contributors., [Online]. Retrieved from the Internet: <URL: http://usbrubberducky.com/#!index.md>, (Acessed Mar. 25, 2016), 6 pgs.
Adrian, Crenshaw, "Plug and Prey: Malicious USB Devices", Presented at Shmoocon, (2011), 41 pgs.
U.S. Appl. No. 15/084,005, U.S. Pat. No. 9,582,445, filed Mar. 29, 2016, USB Drive Security Systems and Methods.

* cited by examiner

EXTERNAL STORAGE DEVICE SECURITY SYSTEMS AND METHODS

CLAIM OF PRIORITY

This patent application claims the benefit of priority to U.S. patent application Ser. No. 15/084,005, filed Mar. 29, 2016, which is hereby incorporated by reference herein in its entirety.

TECHNICAL FIELD

The present disclosure relates generally to Universal Serial Bus (USB) drive security systems and methods.

BACKGROUND

Information security is the practice of defending information from unauthorized access, use, replication, or destruction. Worldwide spending on information security is in the billions of dollars annually and growing fast. To ensure that information systems and data are secure, companies and governments employ various security controls such as firewalls, anti-virus protection, encryption of sensitive data, etc., and retain numerous personnel to implement these solutions and to respond to any breach of security controls. None of these controls are effective against a user plugging in a compromised Universal Serial Bus (USB) drive into his or her computer.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
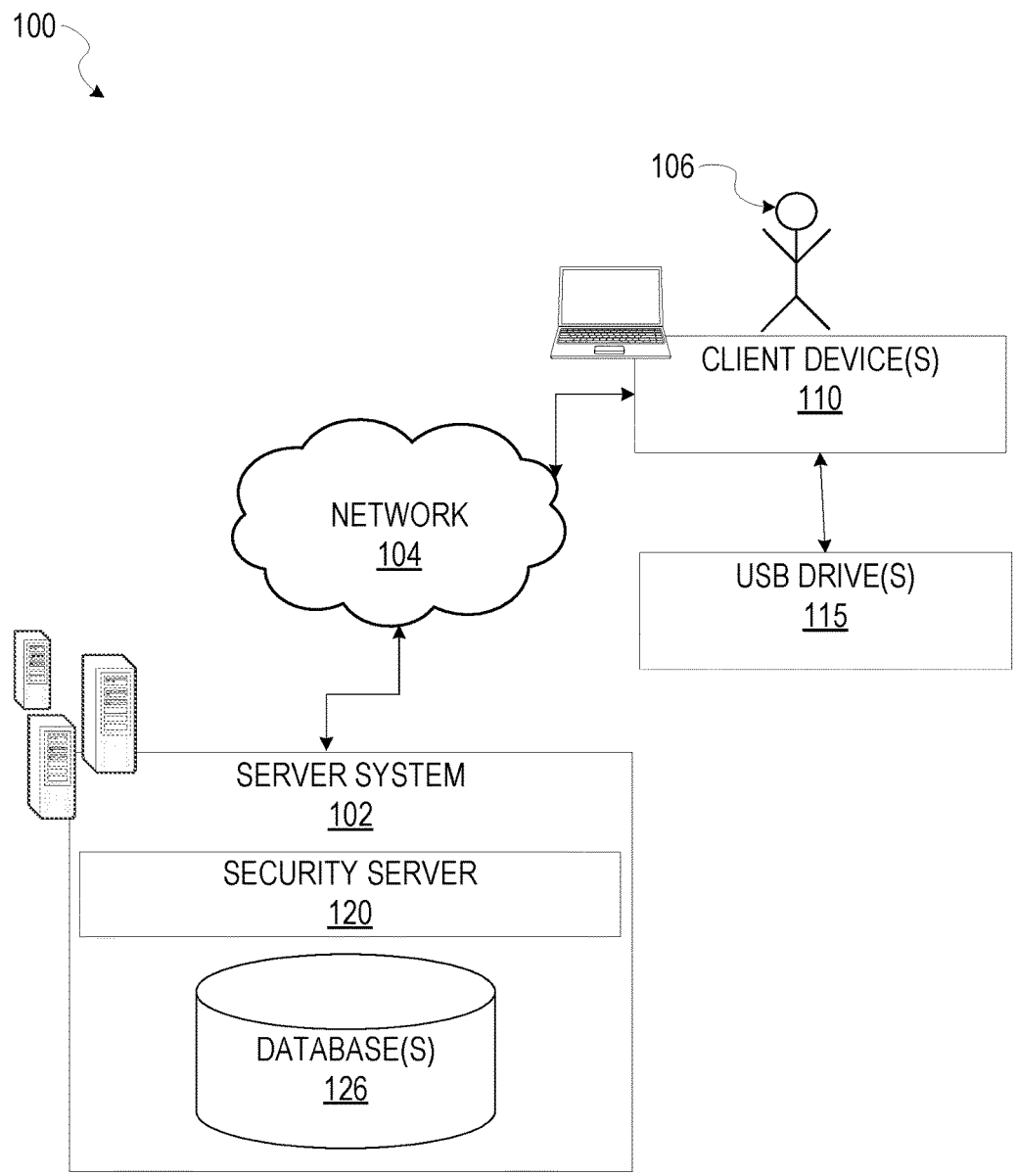
FIG. 1 is a block diagram illustrating a networked system configured to provide USB drive security, according to some example embodiments.

USB drives are such an easy mechanism for storing and sharing information that they are handed out at conferences, exchanged between colleagues and friends for work and personal use, and have been used specifically for hacking into sensitive government and corporate systems to gain access to confidential information. Unfortunately users are not educated on how dangerous USB drives can be. Systems and methods described herein provide example mechanisms for defending against compromised USB drives and for offensively tracking and identifying target users. In some example embodiments, the devices and methods described herein may be used to train employees on the dangers of connecting unauthorized devices (e.g., USB drives) to computing devices.

For example, a customized USB drive is provided that includes special instructions for executing a macro once the USB drive is inserted by a user into a computer. The USB drive can be left in an obvious location where the user may see it and pick it up (e.g., parking lot, break room, walkway, bathroom, executive offices, information technology personnel desk, etc.). Once the user finds the customized USB drive, he may insert it into his computer to see what is on it or to use for his own use. The customized USB drive may act as a USB HID device (e.g., a keyboard) and use a repeated predetermined key press (e.g., caps lock) as a mechanism to determine whether the driver for the USB drive is successfully installed.

After the USB drive detects that the driver is successfully installed, the USB drive executes any software/instructions such as a macro (e.g., that may run a VBS (Virtual Basic Scripting Edition) Script (e.g., cscript)). In one example, the macro sends digital signals indicating keystrokes to invoke a command prompt on the user's computer. At the command prompt the macro sends digital signals indicating keystrokes to type out instructions (e.g., a script) at the command prompt. The script may be just a few instructions for downloading a payload from a server computer. The macro causes the instructions to be run by sending a digital signal indicating an enter key to run the script to download the payload from the server computer. In this way the USB drive may control the instructions and execution of the script and does not have to rely upon a user or the computer to execute the macro or script.

The macro downloads a payload from a server computer and then executes the payload on the user's computer. The payload collects data from the user's computer, such as a username, an IP address, a MAC address, a domain name, a computer name, a date, a time, an operating system, a screen capture, a geolocation, etc. The payload sends the data collected (e.g., via a HTTP POST) to a server computer for storage and analysis.

The server computer may generate reports based on the data and provide access to an administrator to the data and reports. For example, the administrator can view (e.g., via a web interface or application) how many USB drives were placed and where they were placed. In addition, for each USB drive, the administrator may view which drives were inserted into a computer and which were not. The administrator may also view the data collected from each machine and any analysis or reports generated by the server computer. The administrator may use this information to determine which departments or personnel need more education about USB drives, test out other security methods, see trends, etc. Accordingly, embodiments described herein allow an administrator (e.g., security personnel) to assess the risk associated with USB drives to determine further security and educational measures to defend against compromised USB drives. Moreover, there may be a readme file on the USB drive that educates the user on the security issues with unknown USB drives, or the USB drive may provide an alert to the user with similar information.

The example embodiments described herein may also be used to track and identify particular users. For example, the customized USB drive may be left in an obvious location for a particular user (e.g., a target user). The USB drive may cause various data to be collected from the computer of the target user, and the server computer may analyze that data to determine the type of computer or computers the target user accesses, where the target user travels, where the target user lives or works, other devices used by the target user, etc.

FIG. 1 is a block diagram illustrating a networked system 100 configured to provide USB drive security, according to some example embodiments. The system 100 may include one or more client devices such as client device(s) 110. The client device(s) 110 may comprise, but not be limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, computers in vehicles, or any other communication device that a user may utilize to access the networked system 100. In some embodiments, the client device(s) 110 may comprise a display module (not shown) to display information (e.g., in the form of user interfaces). In further embodiments, the client device(s) 110 may comprise one or more of touch screens, accelerometers, gyroscopes, cameras, microphones, global positioning system (GPS) devices, and so forth.

The client device(s) 110 may access the various data and applications provided by other entities in the system 100 via a web client (e.g., a browser, such as the Internet Explorer® browser developed by Microsoft® Corporation of Redmond, Wash. State) or one or more client applications. The client device(s) 110 may include one or more applications (also referred to as "apps") such as, but not limited to, a web browser, messaging application, electronic mail (email) application, an e-commerce site application, a mapping or location application, a time management application, a security application, and the like. In some embodiments, one or more applications may be included in a given client device 110, and configured to locally provide the user interface and at least some of the functionalities with the application configured to communicate with other entities in the system 100 (e.g., server system 102), on an as needed basis, for data acrd/or processing capabilities not locally available (e.g., access security analysis and reports related to USB drives, to authenticate a user 106, etc.). Conversely, one or more applications may not be included in the client device 110, and then the client device 110 may use its web browser to access the one or more applications hosted on other entities in the system 100 (e.g., server system 102).

One or more users 106 may be a person, a machine, or other means of interacting with the client device(s) 110. In example embodiments, the user 106 may not be part of the system 100, but may interact with the system 100 via the client device(s) 110 or other means. For instance, the user 106 may provide input (e.g., touch screen input or alphanumeric input) to the client device(s) 110 and the input may be communicated to other entities in the system 100 (e.g., server system 102) via the network 104. In this instance, the other entities in the system 100, in response to receiving the input from the user 106, may communicate information to the client device(s) 110 via the network 104 to be presented to the user 106. In this way, the user 106 may interact with the various entities in the system 100 using the client device(s) 110.

Figure 2:
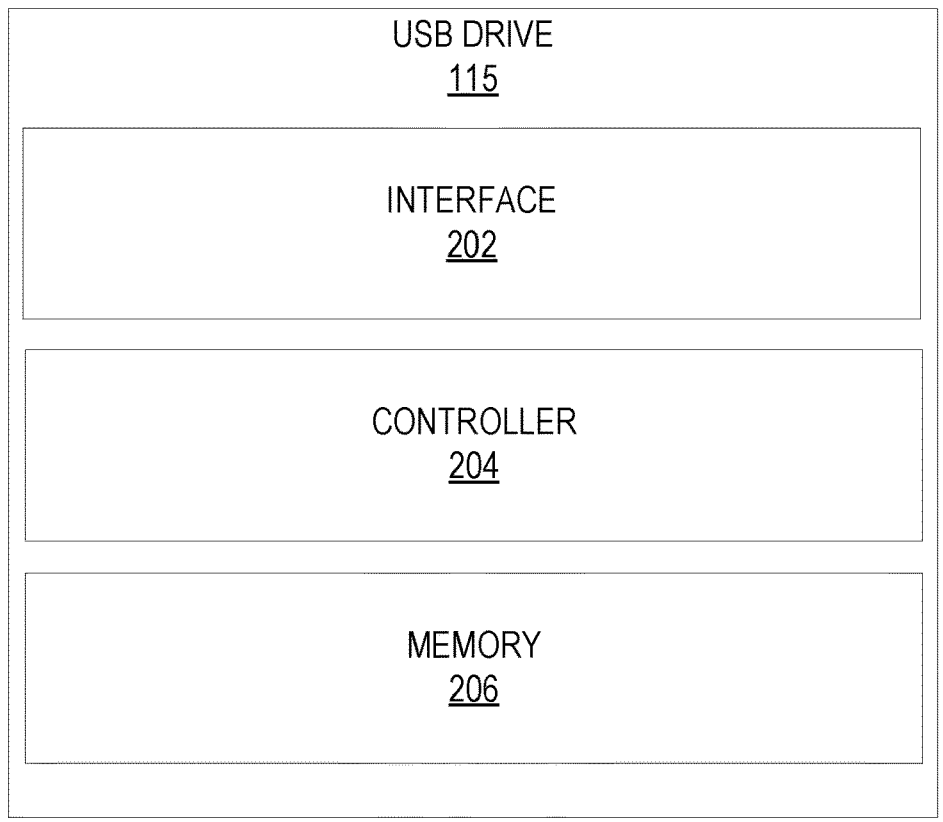
FIG. 2 is a block diagram illustrating an example USB drive, according to some example embodiments.

The USB drive(s) 115 may be a data storage device. The USB drive(s) 115 may be known by a variety of different names, such as a USB flash drive, flash memory drive, jump drive, pen drive, thumb drive, USB data stick, etc. As shown in FIG. 2, a USB drive 115 may comprise an interface 202, a controller 204, and a memory 206. The interface 202 may be used to couple with or connect to a computing device, such as client device(s) 110.

The controller 204 may be a microcontroller configured to perform various methods described herein. The controller 204 may utilize software, firmware (e.g., a software program or set of instructions programmed into a read-only memory), and/or hardware to perform various functions described herein. For example, the controller 204 may contain instructions to send a digital signal indicating a predetermined keystroke to a client device 110, execute a macro once the controller 204 receives a feedback response from the digital signal, and cause a payload that has been downloaded from a server computer, to be executed on the client device 110.

The memory 206 may be used to store the instructions embodying any one or more of the methodologies or functions described herein, and other data. The memory 206 may be accessible by the controller 204. The memory 206 may comprise one or more different types of memory. For example, the memory 206 may refer to a computer or machine-readable medium able to store data temporarily or permanently and may be taken to include, but not be limited to, random-access memory (RAM), read-only memory (ROM), buffer memory, flash memory, and cache memory.

While the memory 206 is shown, in an example embodiment, to be a single medium, the term "memory" or "machine-readable medium" should be taken to include a single medium or multiple media able to store the instructions, or other data. The memory 206 may be memory separate from the controller 204, the memory 206 may reside completely, or at least partially, within the controller 204 (e.g., the controller 204 may be a microcontroller with a small amount of on-chip ROM and RAM), etc., or any suitable combination thereof. The term "machine-readable medium" shall also be taken to include any medium, or combination of multiple media, that is capable of storing instructions for execution by a machine (e.g., USB drive 115), such that the instructions, when executed by one or more processors of the machine (e.g., controller 204), cause the machine to perform any one or more of the methodologies described herein. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The USB drive 115 may be configured to act as a USB host device or USB HID (Human Interface Device). For example, the USB drive 115 may include one or more stored descriptors that include information identifying the USB drive 115 as a host device. When the USB drive 115 is coupled with a computing device (e.g., client device 110), the computing device may read the descriptor(s) to determine that the USB drive 115 is a host device.

In one example, the USB drive 115 may act similar to a keyboard, but instead is pre-programmed ahead of time to type out specific characters automatically. For example, it may be pre-programmed to send a digital signal indicating a predetermined keystroke, such as caps lock, num lock, scroll lock, etc. The USB drive 115 may also act as a combination or hybrid host device (e.g., keyboard device) and storage device (e.g., conventional USB drive).

In an example embodiment, hardware of the USB drive 115 may be modified to include a unique identifier and/or a customer identifier (e.g., one or more identifiers may be stored on the USB drive 115). This unique identifier and/or customer identifier may be used to track and identify a particular USB drive 115 and an entity associated with the USB drive 115. For example, the unique identifier associated with the USB drive 115 and/or customer identifier may be sent to a server computer once the USB drive 115 is inserted into a computer. In one example, a payload running on a computing device may pull the unique identifier and/or customer identifier that is stored on the USB drive 115 and send the unique identifier and/or customer identifier a server computer. The hardware of the USB drive 115 may also be configured so that it would be difficult to repurpose. For example, the hardware layout could be designed so that it is obfuscated by not exposing pads that are attached to pins on the chip that are responsible for programming internal memory.

Referring again to FIG. 1, the user 106 may use one or more USB drive(s) 115 by coupling the USB drive(s) 115 with one or more client device(s) 110. For example, the user 106 may want to store data on the USB drive(s) 115 or retrieve data from the USB drive(s) 115. The user 106 may connect the USB drive(s) 115 to the client device 110 by inserting the interface of the USB drive(s) 115 into a USB interface on the client device(s) 110. The user 106 may then store data from the client device(s) 110 or the Internet via client device(s) 110, or may access or copy data from the USB drive(s) 115 to the client device(s) 110.

In some embodiments, the user 106 may be a security administrator. The user 106 may use a client device 110 to access data, analysis, reports, etc. related to USB drive(s) 115.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

A server system 102 may provide server-side functionality via the network 104 (e.g., the Internet or wide area network (WAN)) to one or more client devices 110. The server system 102 may be a cloud computing environment according to some example embodiments.

The server system 102 may include security server 120 that may be communicatively coupled with one or more databases 126. The database(s) 126 may be storage devices that store information such as payloads for collecting data from a computing device such as client device(s) 110, data collected from a computing device, analytics or reports related to data collected from one more computing devices, etc.

The security server 120 may provide functionality to receive a request for a payload from a client device(s) 110, send a payload to a client device 110, receive data collected from one or more client device(s) 110, store data collected from one or more client device(s) 110, analyze data collected from one or more client device(s) 110, and generate one or more reports associated with the data, etc.

The server system 102 may interact with client device(s) 110 to provide analysis and reports related to data collected from one or more client device(s) 110. For example, the server system 102 may provide a user interface for a user 106, such as a security administrator at an entity, to review analysis and reports related to USB drive security issues.

Figure 3:
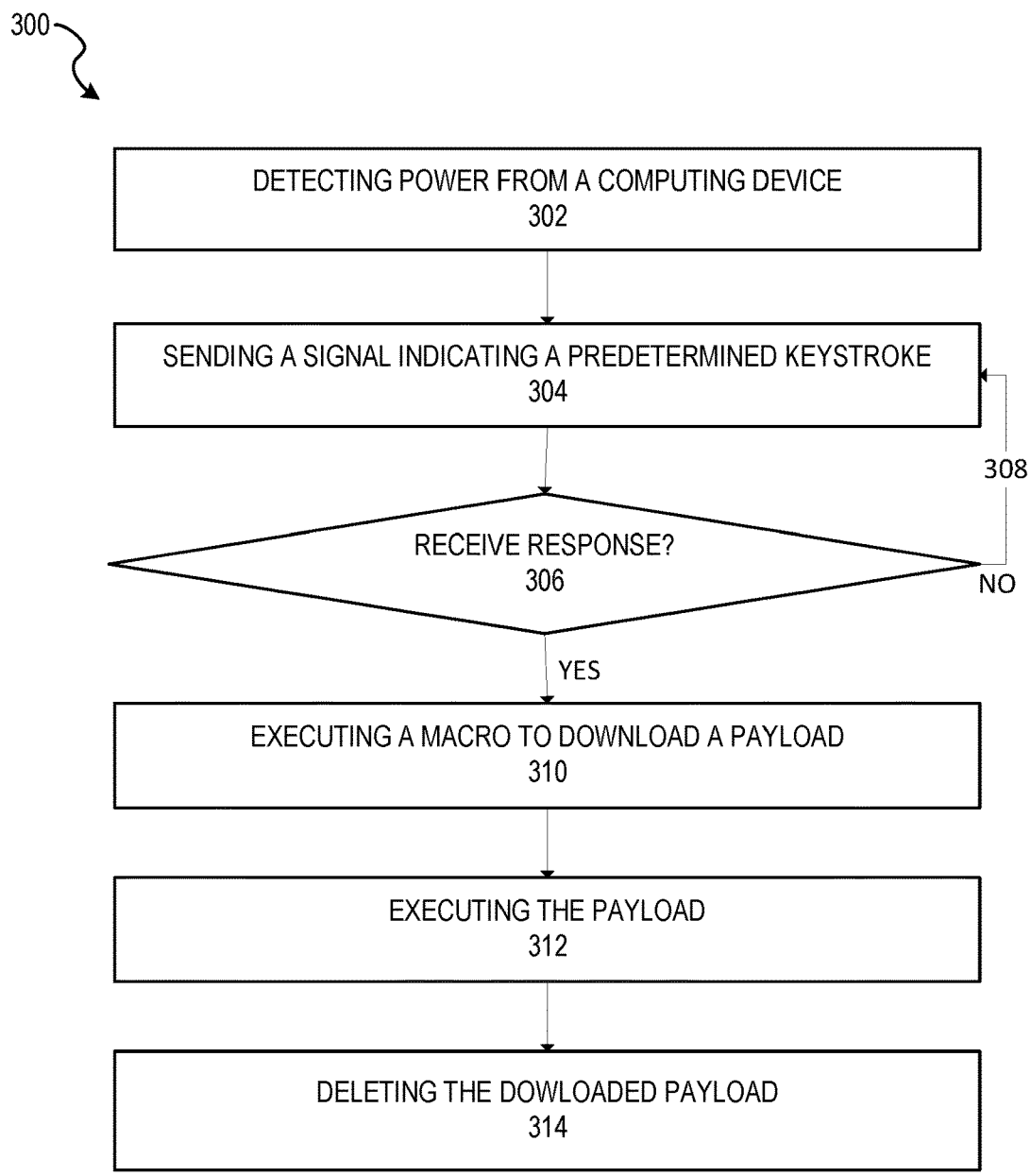
FIG. 3 is a flowchart illustrating aspects of a method for interfacing with a computing device, according to some example embodiments.

FIG. 3 is a flow chart illustrating aspects of a method 300 for interfacing with a computing device, according to some example embodiments. For illustrative purposes, method 300 is described with respect to the networked system 100 of FIG. 1, and USB drive 115 of FIG. 2. It is to be understood that method 300 may be practiced with other system configurations in other embodiments.

In one example, a user 106 may find a USB drive in the lobby when he arrives at work and take it to his computer at work to see if he can figure out who it belongs to or what data is on it. The user 106 may connect or insert a USB drive 115 into a client device 110. In operation 302, the USB drive 115 (e.g., via controller 204) may detect that power has been received from the client device 110.

The USB drive 115 (e.g., via the controller 204) will want to know when the drivers for the USB drive 115 have been installed on the client device 110 so that it may execute a macro. If the macro is executed before the drivers are installed, the intent of the macro may fail. The controller 204 may be a microcontroller that is a small computer without an operating system. The controller 204 may comprise instructions that it is programmed to do as soon as it gets power. The controller 204 has a mechanism for detecting when drivers are installed so that it can execute further instructions. In one example embodiment the controller 204 may send predetermined digital signals to the client device 110 until it receives a feedback response from the client device 110 indicating that the drivers for the USB drive 115 have been installed. For example, if the controller 204 receives a response from the operating system of the client device 110, the controller 204 will know that the drivers have been installed for that communication to occur. Example embodiments describing a digital signal indicating a keystroke are used herein, however, any digital signal may be used that receives a feedback in response.

At operation 304 the controller 204 sends a digital signal to the client device 110 indicating a predetermined keystroke. In one example, the controller 204 may send a digital signal indicating a caps lock key press; however, any key that has a feedback response may be used. At operation 306, the controller 204 determines whether a feedback response has been received from the client device 110 (e.g., indicating that the predetermined keystroke was received). If a response has not been received, at operation 308 the controller 204 returns to operation 304. The controller 204 continues looping through operations 304-308 until the controller 204 receives a feedback response from the client device 110.

In the example of using a caps lock key press, the feedback response may be a light on the keyboard. The light on the keyboard illuminates because the client device 110 (e.g., the operating system of the client device 110) instructs the light to turn on in response to a caps lock key press (e.g., a digital input signal from a keyboard). The controller 204 may be able to determine if the caps lock is enabled or not by querying the operating system of the client device 110. This is one example of how to determine whether a two way communication between the USB drive and operating system/client device 110 has been established.

Once the controller 204 receives a feedback response, the controller 204 executes a macro, at operation 310, to download a payload to the client device 110, from a server computer (e.g., security server 120). The macro may be a very short macro (e.g., a small payload, program, script, etc.), with as few characters as possible, that functions to download a payload (e.g., a larger payload) from a server computer. The macro may request the payload from the server computer. Once the payload is downloaded and received at the client device 110, the controller 204 causes the payload to be executed on the client device 110, at operation 312. For example, the macro may detect when the payload has been downloaded and then execute the payload when it is finished downloading.

At operation 314, the controller 204 may delete the downloaded payload from the client device 110 (e.g., after the payload has been executed, or after the payload has finished executing). In one example the macro deletes the payload after it has been executed and is running in memory. In another example the payload could delete itself after it has been executed. The program may be deleted but still be running in memory. In this way, even if the user were to remove the USB drive 115, the payload may still finish collecting and sending data.

Figure 4:
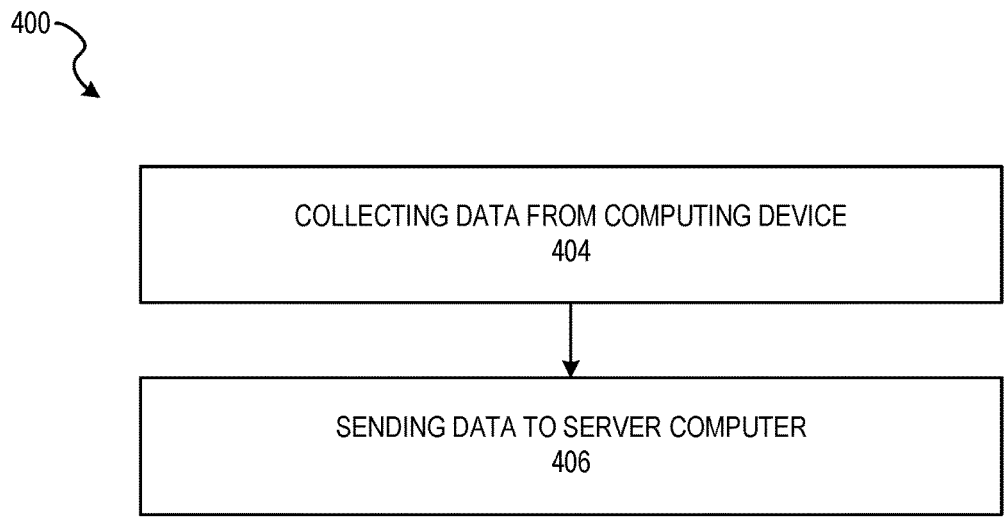
FIG. 4 is a flowchart illustrating aspects of a method for collecting and sending data, according to some example embodiments.

FIG. 4 is a flow chart illustrating aspects of a method 400 for collecting and sending data, according to some example embodiments. For illustrative purposes, method 400 is described with respect to the networked system 100 of FIG. 1, and USB drive 115 of FIG. 2. It is to be understood that method 400 may be practiced with other system configurations in other embodiments.

At operation 404, the payload on the client device 110 collects data from the client device 110 (e.g., computing device). For example, the payload may collect identifying data, such as one or more usernames, a hostname, an IP address, a MAC address, a domain name, a computer name, a date, a time, an operating system type, a screen capture, a geolocation, etc. In another example, the payload may collect files or other data off of the computer.

At operation 406, the payload sends the data to a server computer (e.g., security server 120) for storage, analysis, and reporting. The data may further include a unique identifier associated with the USB drive 115 and/or a customer identifier associated with an entity that placed the USB drive 115 in the client device 110.

In an example embodiment, the payload or USB drive 115 may detect whether the client device 110 is able to receive the payload and send data. For example, the payload or USB drive 115 may determine whether the client device 110 is connected to a network or other means (e.g., Bluetooth, short wave radio, etc.) for sending and receiving data from a remote server computer. If the client device 110 is not able to receive the payload and send data, the USB drive 115 may wait until the next time the client device 110 is connected to a network or other communication means to download the payload and/or for the payload to send data to the server computer.

In another example embodiment, the USB drive 115 may detect other devices near the client device 110. For example, it may look for other devices in Bluetooth range and report back on those items. For instance, the USB drive 115 may detect that the user 106 also has an iPhone, a windows phone, an iPad, a photo frame, a Fitbit, etc.

In another example embodiment, the USB drive 115 may notify the user to educate the user about the security risks of using an unknown USB drive. For example, the USB drive 115 may contain a readme file with information, or may cause a message to be displayed to the user.

Figure 5:
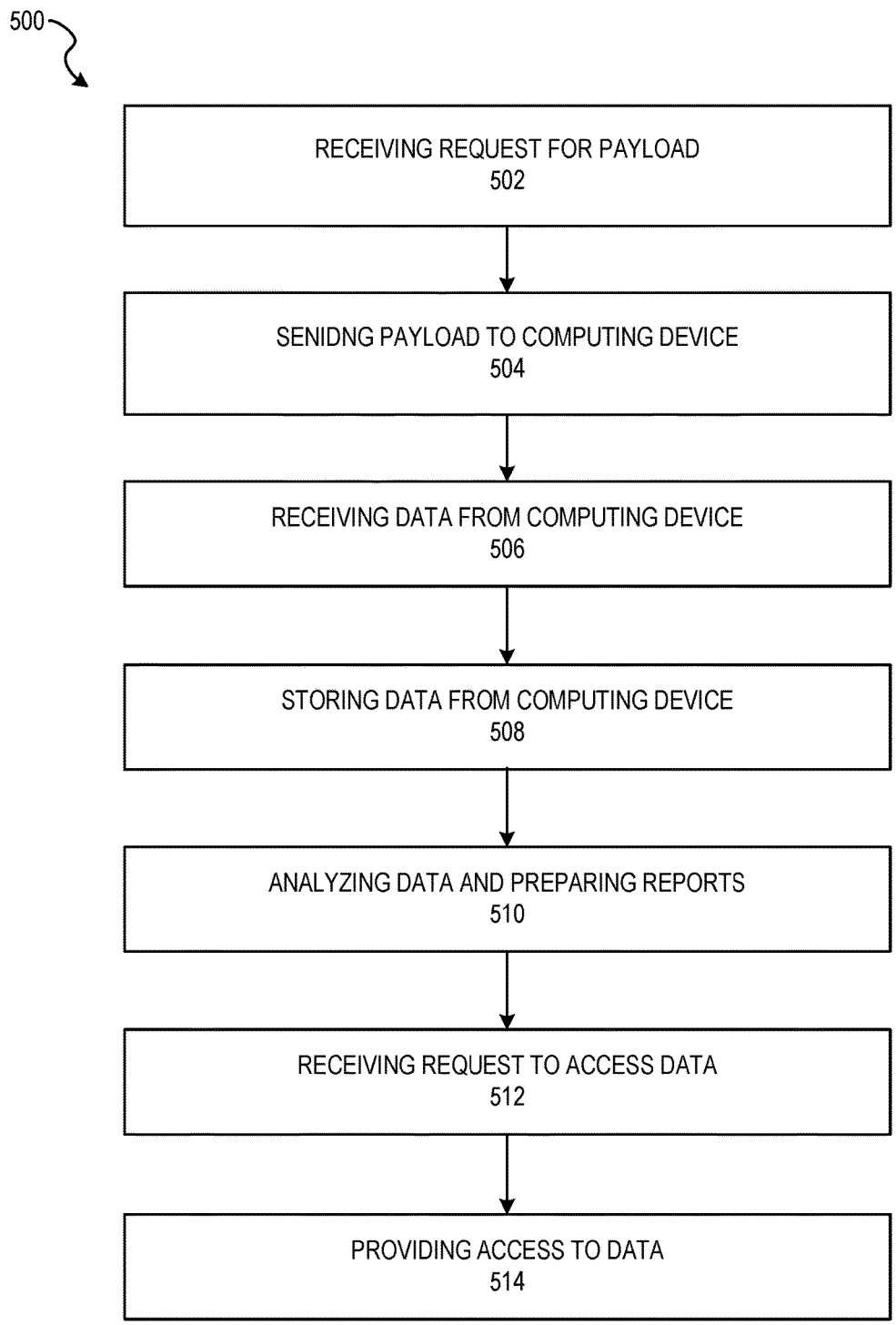
FIG. 5 is a flow chart illustrating aspects of a method for receiving and analyzing data, according to some example embodiments.

FIG. 5 is a flow chart illustrating aspects of a method 500 for receiving and analyzing data, according to some example embodiments. For illustrative purposes, method 500 is described with respect to the networked system 100 of FIG. 1. It is to be understood that method 500 may be practiced with other system configurations in other embodiments.

At operation 502, a server computer (e.g., security server 120) receives a request for a payload from a client device 110 (e.g., via a macro executed by controller 204 of USB drive 115). The security server 120 may authenticate the request (e.g., confirm that the request is received from an authorized USB drive, etc.). At operation 504, the security server 120 sends the payload to the computing device (e.g., client device 110).

At operation 506, the security server 120 receives data from the computing device, and stores the data at operation 508. At operation 510 the security server 120 analyzes the data and prepares reports based on the analysis of the data. For example, the security server 120 may catalog the received data, format the received data, and make the data available to present to an administrator.

At operation 512, the security server 120 receives a request to access data and analysis/reports. For example, a user 106 may use a client device 110 to log on to a website or access an application. The security server 120 may confirm that the user 106 is authorized to access the data and analysis (e.g., correct username and password, from an authorized client device, etc.). At operation 514, the security server 120 provides access to the data to the user 106. The user 106 (e.g., security administrator) may be able to filter and query the data. For example, the administrator may be a large organization deploying any number of USB drives 115 (e.g., 15, 20, 30, 100, 200, etc.). The security administrator may want to filter the data based on the location where the USB drives 115 were placed (e.g., in a particular building, in the parking lot, etc.). In this way the security administrator can see if more USB drives 115 were inserted in computers in a particular building or department, etc., and target education accordingly. In another example, a security administrator may filter or query the data based on various factors. For example, the security administrator may filter or query the data based on whether people on average plug in the USB drive 115 into their personal computer or work computer, etc. Also, the security administrator may be able to view timing information related to when or how soon a USB drive 115 was inserted into a device after leaving the USB drive 115 in various locations, etc.

Example embodiments described herein utilize a USB drive. Other external storage devices, such as a compact disc (CD) or digital versatile disc (DVD), could be used in embodiments described herein. For example, a client device 110 may be configured to "autorun" after a CD or DVD is inserted. The macro stored on the CD or DVD would automatically run, cause the payload to be downloaded, etc. as described above. Likewise, other interfaces for interfacing with a storage device may be utilized. For example, IEEE 1394 standard High Performance Serial Bus (e.g., Firewire), High-Definition Multimedia Interface (HDMI), Lightning, or other means.

Figure 6:
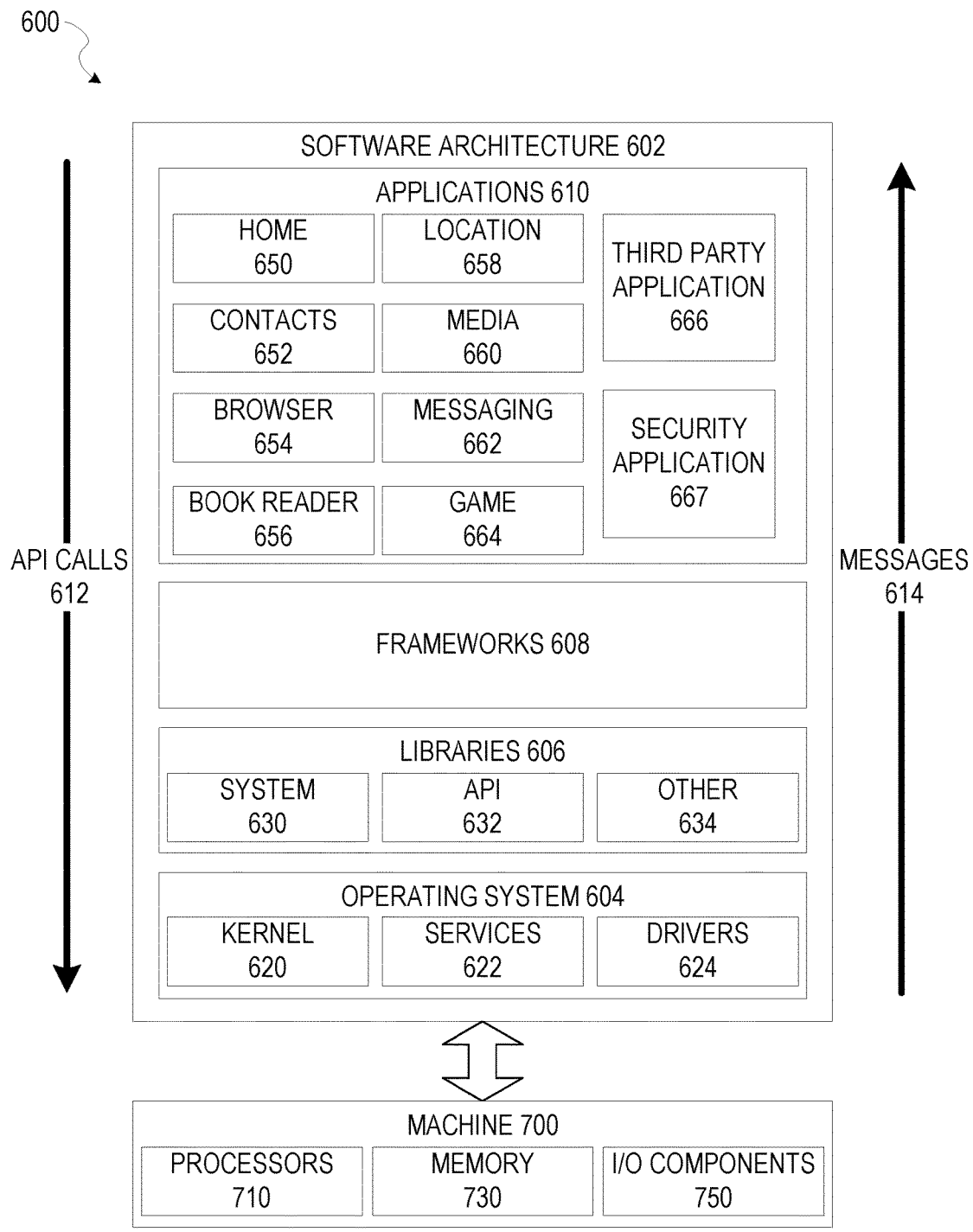
FIG. 6 is a block diagram illustrating an example of a software architecture that may be installed on a machine, according to some example embodiments.

FIG. 6 is a block diagram 600 illustrating a software architecture 602, which can be installed on any one or more of the devices described above. For example, in various embodiments, client device(s) 110, server system 102, and security server 120 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, USB drive drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as a third party applications 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 666 can invoke the API calls 612 provided by the operating system 604 to facilitate functionality described herein.

Some embodiments may include a security application 667. In certain embodiments, this may be a stand-alone application that operates to manage communications with a server system such as server system 102. In other embodiments, this functionality may be integrated with another application such as a broader security or information systems application or another such application. In other embodiments the security application 667 may reside on a server computer, such as on server system 102, and be accessible via a client device 110.

Security application 667 may receive requests for various data, analysis, and reports related to USB drive(s) 115, and provide such data, analysis, and reports in response to such a request. Security application 667 may display various options for security data and may provide the capability for a user to input data associated with USB drive(s) 115 and related information via a touch interface, keyboard, etc., of machine 700, communication with a server system via I/O components 750, and receipt and storage of USB drive data in memory 730. Presentation of USB drive security information and user inputs associated with USB drive security information may be managed by security application 667 using different frameworks 608, library 606 elements, or operating system 604 elements operating on a machine 700.

Figure 7:
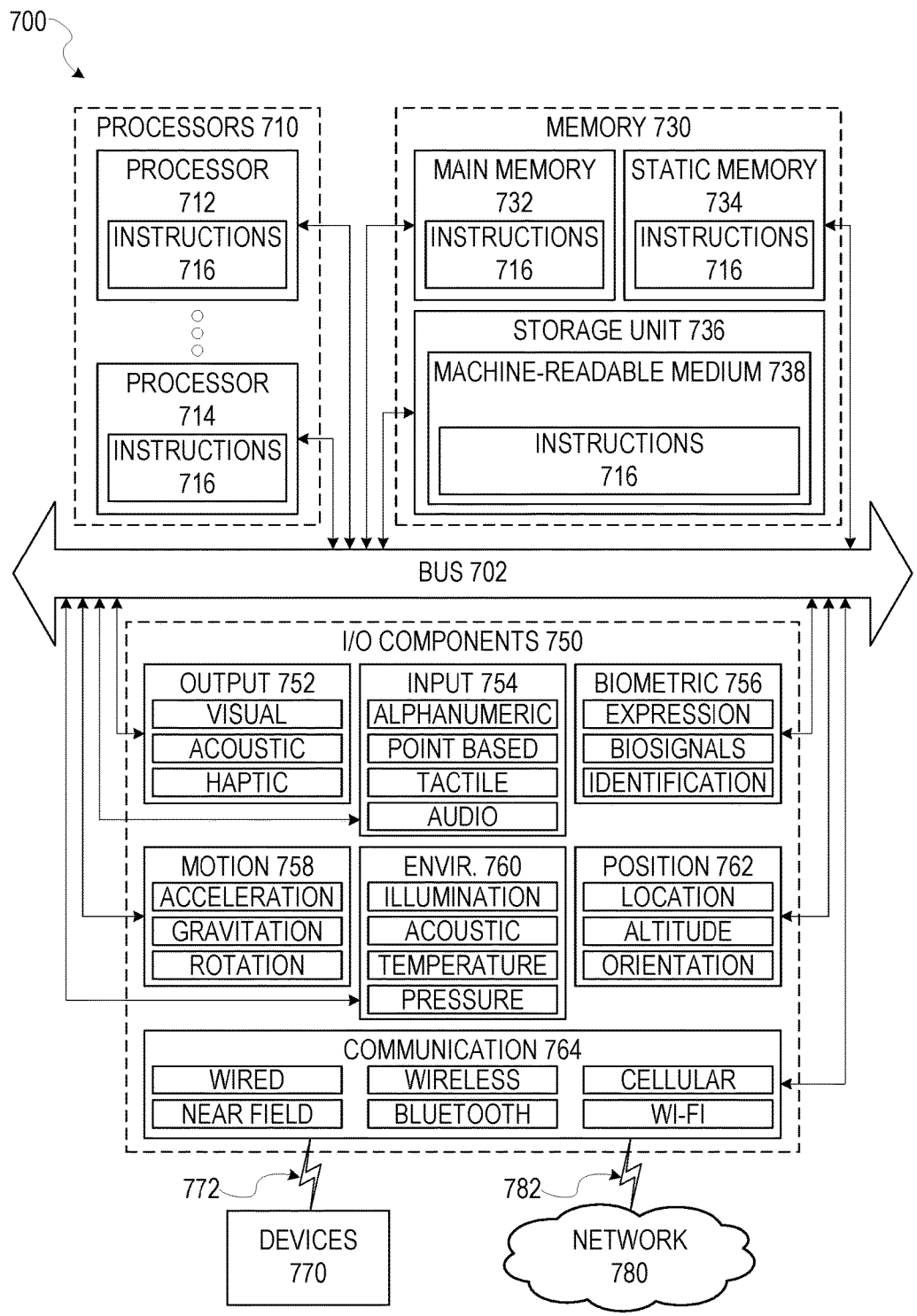
FIG. 7 is a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server system 102, security server 120, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RBI)) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the medium 738 should be considered as being transportable from one physical location to another. Additionally, since the machine-readable medium 738 is tangible, the medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fail within a scope of embodiments of the present disclosure as represented by the appended claims. The specification and drawings are, accordingly, to be regarded in an illustrative rather than a restrictive sense.

What is claimed is:

1. A method comprising:
    detecting, by an external storage device operatively coupled with a computing device, power from the computing device;
    determining, by the external storage device, that drivers associated with the external storage device have been installed on the computing device by performing operations comprising:
        sending, to the computing device, a digital signal indicating a predetermined keystroke until the external storage device receives a response from the computing device; and
        receiving, from the computing device, a feedback response to the digital signal indicating the predetermined keystroke has been received;
    executing, by the external storage device, a macro to download a payload to the computing device from a server computer;
    causing, by the external storage device, the downloaded payload to execute on the computing device; and
    causing, by the external storage device, the downloaded payload to be deleted from the computing device.

2. The method of claim 1, wherein the external storage device is configured to be recognized by the computing device as a host device.

3. The method of claim 1, wherein the external storage device is configured to be recognized by the computing device as a hybrid device comprising an external storage device and a keyboard.

4. The method of claim 1, further comprising:
    causing descriptors stored in the external storage device to be read by the computing device to identify the external storage device as a host device.

5. The method of claim 1, wherein the external storage device comprises a stored unique identifier associated with the external storage device, and wherein the method further comprises:
    causing the stored unique identifier to be sent to the server computer.

6. The method of claim 1, wherein the external storage device comprises a stored unique customer identifier, and wherein the method further comprises:
    causing the stored unique customer identifier to be sent to the server computer.

7. The method of claim 1, wherein the payload is downloaded to the computing device, data is collected from the computing device, and the data is sent from the computing device to the server computer and stored by the server computer.

8. The method of claim 7, wherein the data is identifying information associated with the computing device and a user associated with the computing device.

9. The method of claim 8, wherein the identifying information includes at least one from a group comprising:
    a username, a hostname, an IP address, a MAC address, a domain name, a computer name, a date, a time, an operating system, a screen capture, and a geolocation.

10. The method of claim 8, wherein the identifying information comprises a username, a hostname, an IP address, a MAC address, a domain name, a computer name, a date, a time, an operating system, a screen capture, and a geolocation.

11. An external storage device comprising:
    a controller; and
    a machine-readable medium coupled with the controller, the machine-readable medium comprising instructions stored thereon that are executable by the controller to cause the external storage device to perform operations comprising:
        detecting power from a computing device;
        determining that drivers associated with the external storage device have been installed on the computing device by performing operations comprising:
            sending, to the computing device, a digital signal indicating a predetermined keystroke until the external storage device receives a response from the computing device; and
            receiving, from the computing device, a feedback response to the digital signal indicating the predetermined keystroke has been received;
        executing a macro to download a payload to the computing device from a server computer;
        causing the downloaded payload to execute on the computing device; and
        causing the downloaded payload to be deleted from the computing device.

12. The external storage device of claim 11, wherein the external storage device is configured to be recognized by the computing device as a host device.

13. The external storage device of claim 11, wherein the external storage device is configured to be recognized by the computing device as a hybrid device comprising an external storage device and a keyboard.

14. The external storage device of claim 11, the operations further comprising:
    causing descriptors stored in the external storage device to be read by the computing device to identify the external storage device as a host device.

15. The external storage device of claim 11, wherein the external storage device comprises a stored unique identifier associated with the external storage device, and the operations further comprising:
    causing the stored unique identifier to be sent to the server computer.

16. The external storage device of claim 11, wherein the external storage device comprises a stored unique customer identifier.

17. The external storage device of claim 11, the operation further comprising:
    causing the stored unique customer identifier to be sent to the server computer.

18. A non-transitory machine-readable medium comprising instructions stored thereon that are executable by one or more processors to cause an external storage device to perform operations comprising:
    detecting power from a computing device;
    determining that drivers associated with the external storage device have been installed on the computing device by performing operations comprising:
        sending, to the computing device, a digital signal indicating a predetermined keystroke until the external storage device receives a response from the computing device; and
        receiving, from the computing device, a feedback response to the digital signal indicating the predetermined keystroke has been received;
    executing a macro to download a payload to the computing device from a server computer;

causing the downloaded payload to execute on the computing device; and causing the downloaded payload to be deleted from the computing device.

19. The non-transitory machine-readable medium of claim 18, wherein before causing the downloaded payload to execute on the computing device, the method further comprises:

detecting that the payload has been downloaded.

20. The non-transitory machine-readable medium of claim 18, wherein the payload is deleted after the payload has been executed and is running in memory.

\* \* \* \* \*